US007676830B2

(12) United States Patent  (10) Patent No.: US 7,676,830 B2
Kuz et al. (45) Date of Patent: Mar. 9, 2010

(54) SYSTEM FOR CONTROLLING ACCESS TO SERVICES PROVIDED BY A SERVER TO A CLIENT TERMINAL

(75) Inventors: Volker Kuz, Braunschweig (DE); Ralph Behrens, Schellerten (DE); Grit Behrens, Schellerten (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1036 days.

(21) Appl. No.: 10/933,783

(22) Filed: Sep. 3, 2004

(65) Prior Publication Data

US 2005/0111468 A1 May 26, 2005

(30) Foreign Application Priority Data

Sep. 4, 2003 (EP) ................... 03019625

(51) Int. Cl.
*G06F 7/04* (2006.01)
*G06F 15/16* (2006.01)
*G06F 17/30* (2006.01)
*H04L 29/06* (2006.01)

(52) U.S. Cl. ................. 726/5; 726/7; 726/21; 713/152; 713/168; 713/182; 709/203; 709/220; 709/225; 709/229; 455/456.3

(58) Field of Classification Search ....................... 726/5
See application file for complete search history.

(56) References Cited

U.S. PATENT DOCUMENTS 5,422,816 A 6/1995 Sprague et al.

5,502,446 A 3/1996 Denninger (Continued)

FOREIGN PATENT DOCUMENTS

EP 1 143 660 A 10/2001

(Continued)

OTHER PUBLICATIONS

Bretz, Elizabeth, "The Car: Just a Web Browser with Tires", IEEE Spectrum, Jan. 2001, pp. 92-94.*

(Continued)

*Primary Examiner*—Matthew B Smithers
*Assistant Examiner*—Shewaye Gelagay
(74) *Attorney, Agent, or Firm*—Brinks Hofer Gilson & Lione

(57) ABSTRACT

A system for controlling the access of services from a service provider to a client terminal provides capabilities for the user to change and modify the desired services and have the modified access information communicated to the client terminal or navigation device. The system provides a wireless connection between the client terminal and the server by way of a communications network. The server at the service provider may allow a user to modify the configuration data relating to the access rights of the client terminal. The modified configuration data may be stored on the server and wirelessly transmitted to the client terminal and stored on the client terminal. The modified configuration data may provide access to the services provided by a second service provider allowing the navigation device to access the services that are available on the second service provider as well as those available on the first service provider.

16 Claims, 7 Drawing Sheets

U.S. PATENT DOCUMENTS

| | | | |
|---|---|---|---|
| 5,781,150 A | 7/1998 | Norris | |
| 5,797,091 A | 8/1998 | Clise et al. | |
| 5,919,239 A | 7/1999 | Fraker et al. | |
| 6,237,093 B1 | 5/2001 | Vatanen | |
| 6,297,781 B1 | 10/2001 | Turnbull et al. | |
| 6,584,404 B1 | 6/2003 | McBurney et al. | |
| 6,765,528 B2 | 7/2004 | Tranchina et al. | |
| 6,862,524 B1* | 3/2005 | Nagda et al. | 701/209 |
| 7,181,227 B2* | 2/2007 | Wilson et al. | 455/456.1 |
| 2002/0046084 A1* | 4/2002 | Steele et al. | 705/14 |
| 2002/0069419 A1* | 6/2002 | Raverdy et al. | 725/87 |

FOREIGN PATENT DOCUMENTS

| | | |
|---|---|---|
| WO | WO 02/39692 | 5/2002 |

OTHER PUBLICATIONS

"Circuit Cellar," The Magazine for Computer Applications; feature article by Peter Gravestock; www.circuitcellar.com/online; printed Sep. 1999; 4 pgs.

"The Car: Just a Web Browser With Tires," by Elizabeth A. Bretz; IEEE Spectrum, Jan. 2001, pp. 92-94.

"Transportation—Technology 199 Analysis & Forecast," by Elizabeth A. Bertz; IEEE Spectrum; Jan. 1999; pp. 98-1003.

"X Marks the Spot, Maybe," by Elizabeth A. Bretz; IEEE Spectrum; Apr. 2000; pp. 26-36.

* cited by examiner

SYSTEM FOR CONTROLLING ACCESS TO SERVICES PROVIDED BY A SERVER TO A CLIENT TERMINAL

PRIORITY CLAIM

This application claims the benefit of European Patent Application No. EP 03 019 625.7, filed Sep. 4, 2003, which is incorporated by reference herein in its entirety.

BACKGROUND OF THE INVENTION

1. Technical Field

This application relates to a system for controlling the access of client terminals to services on a service provider. In particular this application relates to a system for controlling access to the services provided by a server to client terminals via a communication network. The system also provides a method of controlling the access of user services by a navigation device through a portal.

2. Related Art

Navigation devices may include telecommunication features such as a GSM modem. These telecommunication features may make access to information provided on different communication networks easier. Handheld digital wireless devices such as navigation devices, mobile phones, pagers, two-way radios, smart phones, and communicators, are able to communicate with each other and are able to exchange data by using a common communication protocol and application environment. One possible communication protocol used for the communication of wireless devices with, for instance, the Internet, is a Wireless Application Protocol ("WAP"). WAP is an open global specification that enables users of mobile wireless devices to easily access and interact with information provided on a server through the Internet.

WAP technology may also be used for different services available to the user of a navigation device. For example, such services may provide the user of the navigation device with information relating to location-based services such as traffic services, emergency services, or other services provided by car manufacturers. If the navigation device is provided in a vehicle, services such as finding a special hotel or a certain restaurant, and the like, might also be provided. These services may be accessible by a communication network, for example, through the Internet.

For some services, the user will subscribe with the service to obtain the information. It is possible that some services may be provided free of charge to certain client terminals if the provider is providing the service as a marketing tool. In other instances, only certain terminals or navigation devices or a special group of users may access the services.

Thus, there is a need for a system that permits control for the accessibility of client terminals to a server on which services are provided.

SUMMARY

The application provides a system for modifying and controlling access to various services available from a server to client terminals, where the client terminals and the server are connected via a wireless communication network. The system includes a method for providing modified configuration data on the server, the data relating to the capabilities of the individual terminals and/or access rights of individual terminals to the services provided on the server. This data may be stored on the server, transmitted to the client terminal and stored on the client terminal. The configuration data may be modified by the operator or the client owning the terminal. The client may modify the configured data either through the Internet or through the communication system linking the server to the client terminal. Upon generation or modification of the configured data for the client terminal, the server may wirelessly transmit the re-configured data to the terminal via the communication network linking the server to the client terminal during the next communication session. The transmitted configuration data may be stored on the client terminal upon reception.

A system is also provided that may provide additional configuration data relating to the capabilities for a second server. A second server may be related to an automobile manufacturer that provides additional service access to the customers of another automobile manufacturer or to the customers of after-market navigation devices. Since the configuration data of the client terminals may be generated or modified at the second server and then transmitted to the client terminals, the second server also may be provided with information regarding the capabilities of the added client terminals originally registered with the first service provider. The operator of the second server also may limit access rights of the various client terminals.

Upon receipt from a client terminal of a request for a service, the server may verify that the request is allowed based on the associated configuration data and/or access rights of the terminal. The server may check whether the configuration data has been modified for the requesting terminal by checking the identification number against the configured data. If the data has been modified, or if the system has been reset since the last communication session, the server may transmit the modified data to the client terminal updating the client terminal. If the server determines that access is allowed, the server will provide the requested services.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
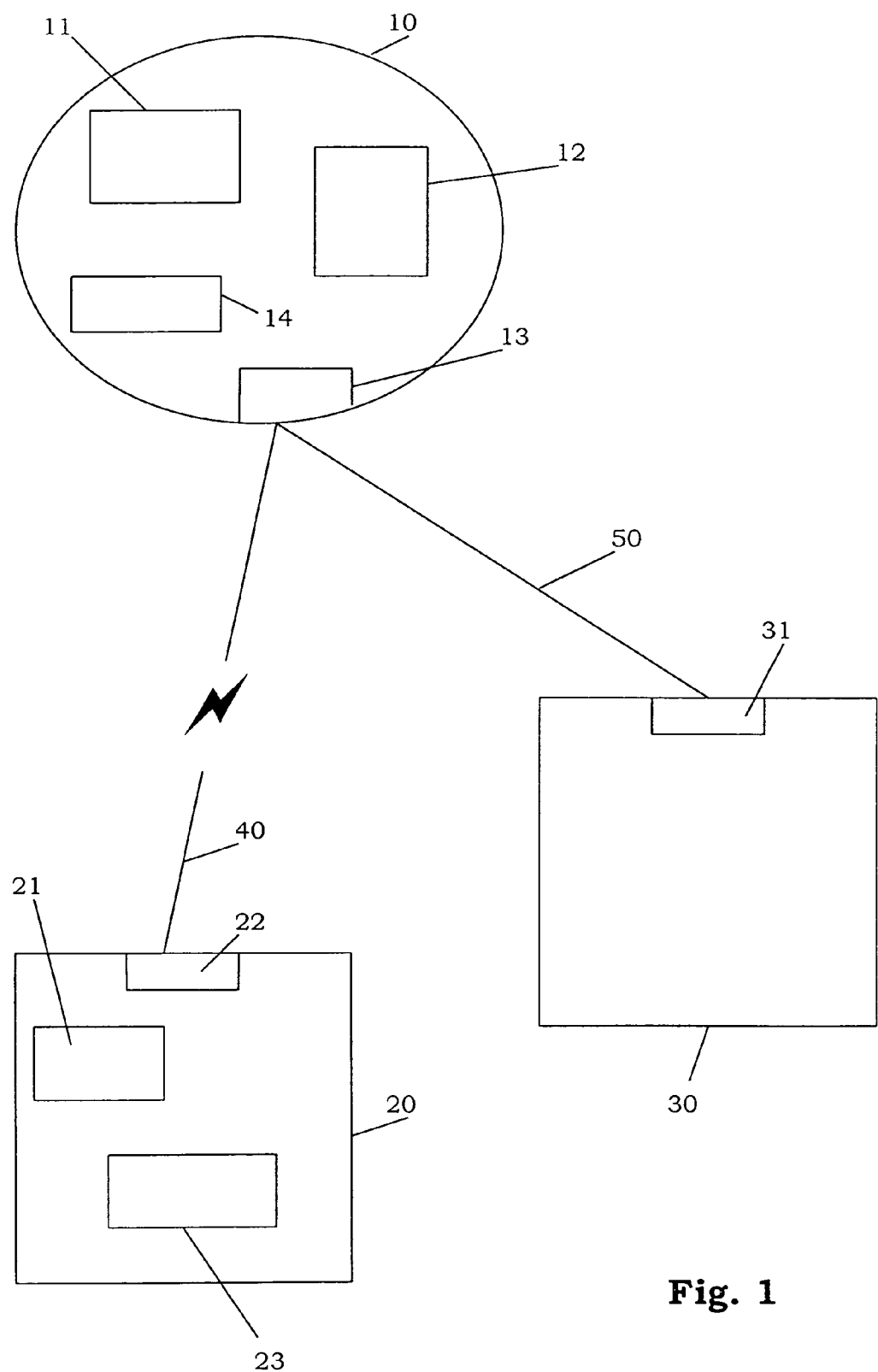
FIG. 1 is a system for controlling service access.

A system for controlling access to services provided on a server 10 is shown in FIG. 1. A client terminal, in this example, a navigation device 20, may access the server 10 via a first communication network 40, for example, a telecommunications network. Although this example illustrates a navigation device accessing the server 10, any kind of mobile terminal that communicates with a server using wireless communication techniques may be used.

The server 10 may be accessible over the Internet. The server 10 may include a storage unit 11 on which the services for the client terminal are provided. The services may include any information that may be useful to the user of the navigation device 20. For example, some types of information important to the user of a navigation device may change more rapidly than road map information normally provided by the navigation device. Those types of information may include location-based services such as traffic information services, emergency call services, route calculating services, diagnostics services for a malfunctioning vehicle, services for finding restaurants or hotels, and the like. The service system communicating with the navigation device 10 may further include an application enabling device 12 for changing the configuration of the navigation device 20. The storage unit 11 further may include an identification number and corresponding password for the terminal. The storage unit 11 also may include the identification number of the terminal together with a predetermined set of services that are allowed for the client terminal, so that the server may decide what information each client terminal may receive.

Different categories of services may be provided on the server 10. For example, there may be a category of services that are free of charge or services that can be used by every client terminal accessing the server. Another category of services provided may be those for which a fee is charged. These services may include pay-per-access services or pay-per-month services. In other instances, some services may used for a trial period.

The navigation device 20 may include a second storage unit 21 for storing the configuration data provided by the server 10. The navigation device 20 may include a transmitting/receiving unit 22 for communicating with a transmitting/receiving unit 13 in communication with the server 10. The server 10 and the navigation device 20 may communicate with each other using the first communication network 40 such as a telecommunications network. For the data exchange between the server 10 and the navigation device 20, wireless application protocol ("WAP") may be used, so that the information provided from the server 10 can be interpreted by the navigation device 20. Although WAP is used in the current example, any other wireless communication protocol, such as SMS, or other future communication protocol may be used for communicating between the server 10 and the client terminal 20. In addition, the navigation device 10 may include other known features such as global positioning and mapping technology. These navigation devices are disclosed in U.S. Pat. No. 6,765,528, U.S. Pat. No. 6,584,404, U.S. Pat. No. 6,297,781, U.S. Pat. No. 6,104,392, and U.S. Pat. No. 5,919, 239 and are incorporated by reference herein. For the purposes of this application, however, only the components necessary for an understanding of the disclosure of this application are described in detail.

The operation of the system shown in FIG. 1 may be described by way of the following example. The user of a navigation device 20 wants to know the location of a restaurant that is in the neighbourhood at a predetermined destination. If the navigation device (client terminal) 20 is registered at the server 10 (as explained later), the navigation device 20 can access the server and ask for the service to provide the location of the restaurant in the neighbourhood. The reply may show the location on a map and/or provide an address. If this is a service for which the user has to pay, the client terminal 20 may have to be registered to enable that service. A control unit 14, which may be a processor or CPU in the server 10, controls the functioning of the server 10, and determines if the navigation device 20 is allowed to use the chosen service. If the navigation device is permitted to use the service, the service data is transmitted to the navigation device 20. If the navigation device 20 is not allowed to use the service, the navigation device 20 may access the application enabling device 12 to register and configure the system to enable the requested service. Alternatively, the user may disable services in the same way.

The changed configuration data may now include new or different access rights for the navigation device 20. These changes may be generated on the server 10 and transmitted to the navigation device 20. The user of the navigation device 20 also may be permitted to change the configuration of the client terminal, however, changes of the configuration should remain under control of the server that manages the configuration data and/or the access rights of the terminal. In some cases, the user may be requesting free services. These may be provided if the client terminal is in a class of devices that is capable of accessing and is authorized to use the free services.

The server may verify any request to alter the access rights to subscription services and may reserve the right to modify the access rights only when the user provides a charge card or an alternate billing method. Further, the creation of the configuration data on the server may be used to control access to the services by multiple terminals. The change will be transmitted to the client terminals individually when the client terminal communicates and requests services from the server.

The configuration of the client terminal 20 may also be changed by accessing the server 10 via a different terminal 30, for example a computer terminal. The computer terminal 30 may be connected to the Internet through a second communication system such as a TCP/IP based communication network 50, enabling the computer terminal 30 and the server 10 to communicate with each other. Although the Internet is suggested for this communication, any communication system between the computer and the server may be used. Communication could be established through a wireless exchange such as a Bluetooth open wireless system or even through a direct modem dial-in. In one example, the computer terminal 30 may log on to server 10 and transmit a service change request by a transmitting/receiving unit 31 within the computer terminal 30. The computer terminal 30 then may access the application enabling device 12 of the server 10 and change the configuration of the client terminal 20. The next time the client terminal 20 accesses the server 10, the changed configuration data will be transmitted to the client terminal 10 and stored on the second storage unit 21 that may be included in the client terminal.

Figure 2:
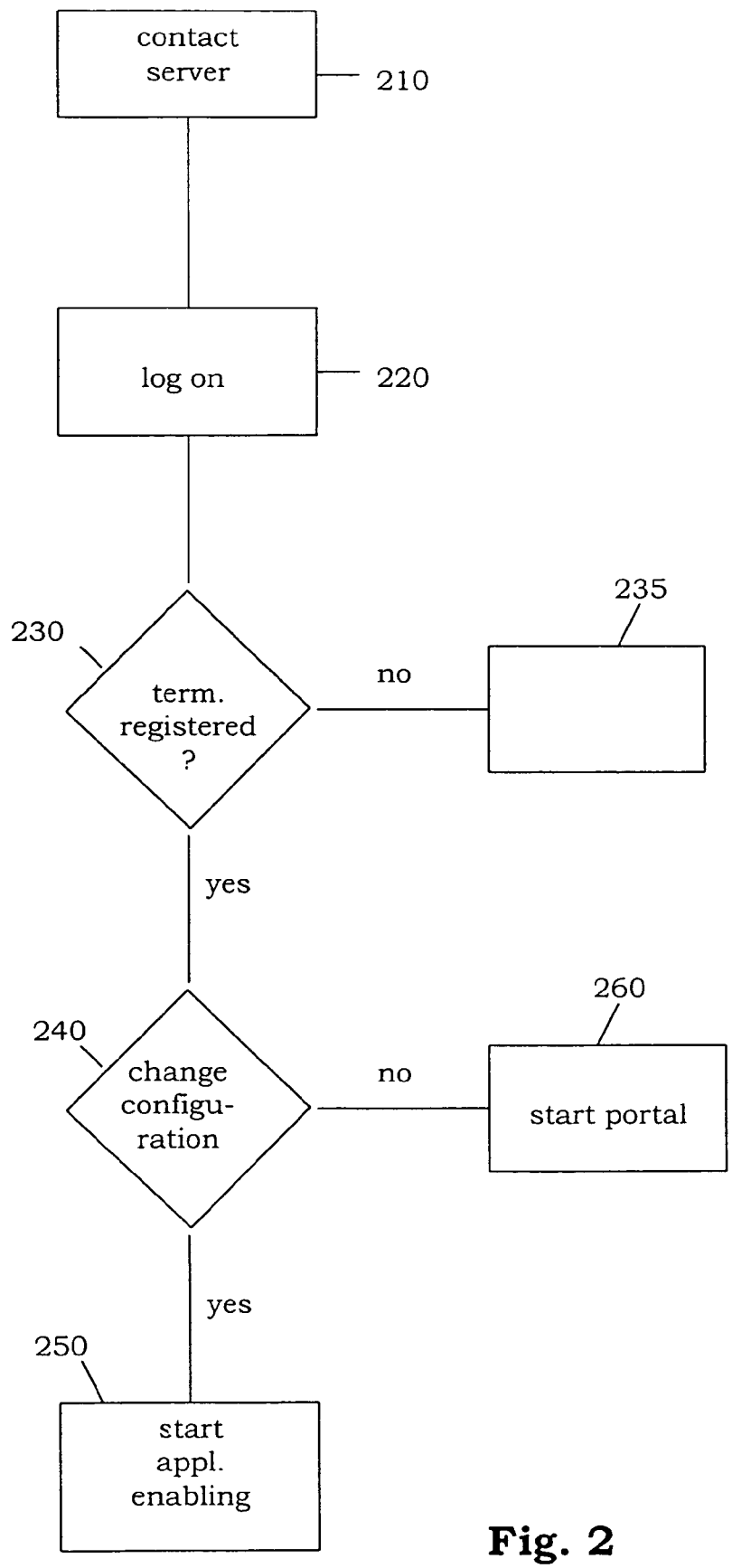
FIG. 2 is a flowchart for changing the configuration of a client terminal.

A method for changing the configuration of a client terminal or for accessing services provided on the server is illustrated in FIG. 2. A server may be contacted 210, for example, by calling the corresponding URL (e.g., http://www.[name of the server].com) of the server. The client terminal may be logged on to the server 220. A determination may be made whether the client terminal has previously registered with the server 230. If the terminal has not previously registered with the server, the portal provided on the server may be started in a standard configuration, however pay-per-access services or pay-per-month services may not be allowed by the user of the terminal. A message also may be generated notifying the user that a registration is necessary to use the services or that a registration procedure has been started 235. If the terminal is registered, then the configuration of the terminal may be changed 240 by the user. If it is desired to change the configuration, the application enabling device is started 250. With the application enabling device the configuration of a client terminal may be changed, for example certain services may be added or dropped within the subscription. If the configuration is not to be changed, the portal may be started 260 and services may be accessed if they are authorized.

Figure 3:
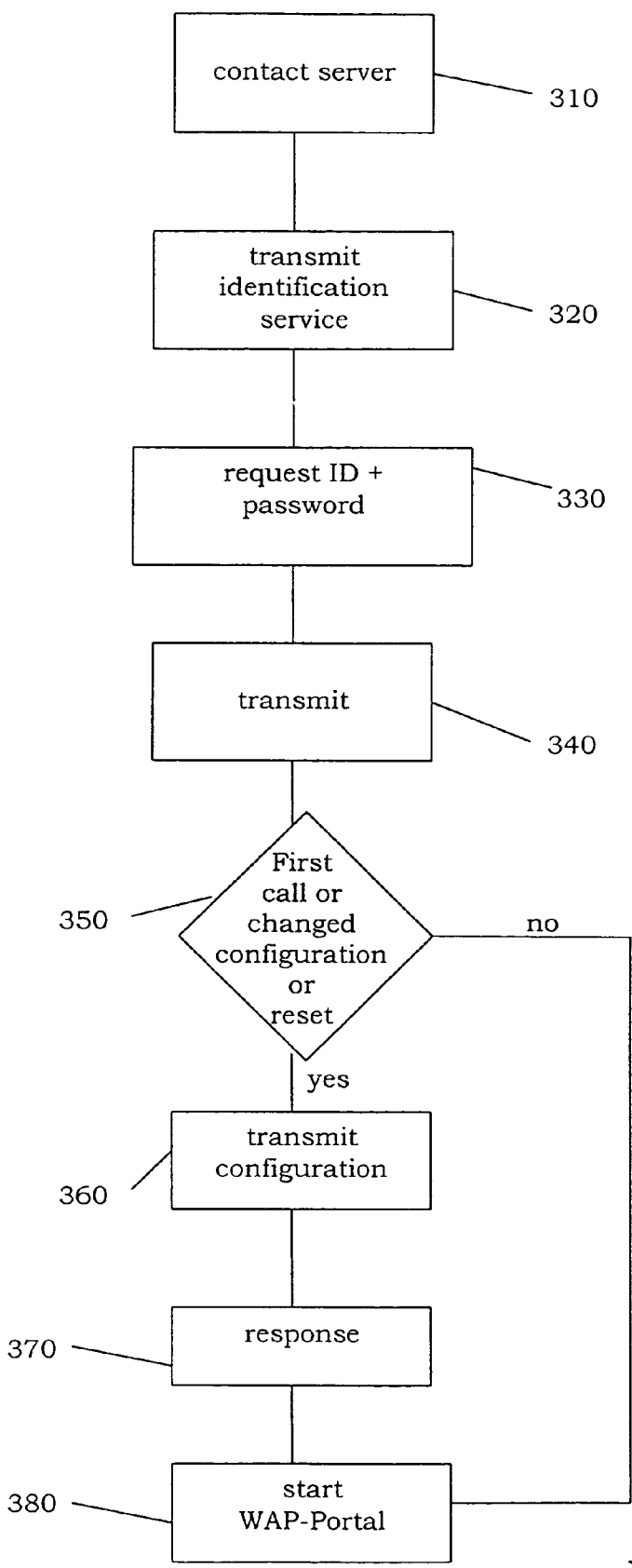
FIG. 3 is a flowchart for a service request by a client terminal.

The changing of the configuration for a client terminal is shown in more detail in FIG. 3. In this example, the server may be contacted 310 by the client terminal. The server may generate an identification service request requiring the client terminal to respond and transmit an identification number and system password. The generated identification service request will be transmitted to the client terminal 320 requesting the identification number and the password of the client terminal 330. The identification number and password may have been previously stored on the client terminal during a set-up session. It may not be necessary for the number and password to be entered by the user if previously stored on the client terminal. Whether re-entered by the user, or stored previously and automatically entered, the requested identification number and password will be transmitted to the server 340. If the identification number and the password fit together, the portal is started (not shown). Different identification numbers for multiple terminals may be stored with their respective passwords on the server 10, for example, in the first storage unit 11.

The server may determine whether the client terminal is contacting the server for the first time or whether the configuration data has been changed since the terminal contacted the server the last time 350. For example, the user of the client terminal may have used the computer terminal 30 to change the configuration. In this case, the modified configuration data is available for transmission. When the client terminal contacts the server, the configuration data may be transmitted to the client terminal step 360. In another example, it may be determined that the terminal was reset after the last log-in 350. Further, the terminal may have been reset or power to the terminal may have been lost and a flag may be set in the terminal. The presence of the flag will be transmitted to the server during the log-on procedure, and the server will detect the flag indicating that the terminal has been reset. For both of the previous examples, the server may transmit a standard configuration to the client terminal 360. Upon reception, the client terminal may acknowledge that it received the transmitted configuration data and stored the configuration data in the second storage unit 370. The portal may be started and accessible to the client terminal 360. While the portal is active, the user may choose the requested service or may change the configuration of the navigation device by starting the application enabling device 380.

Figure 4:
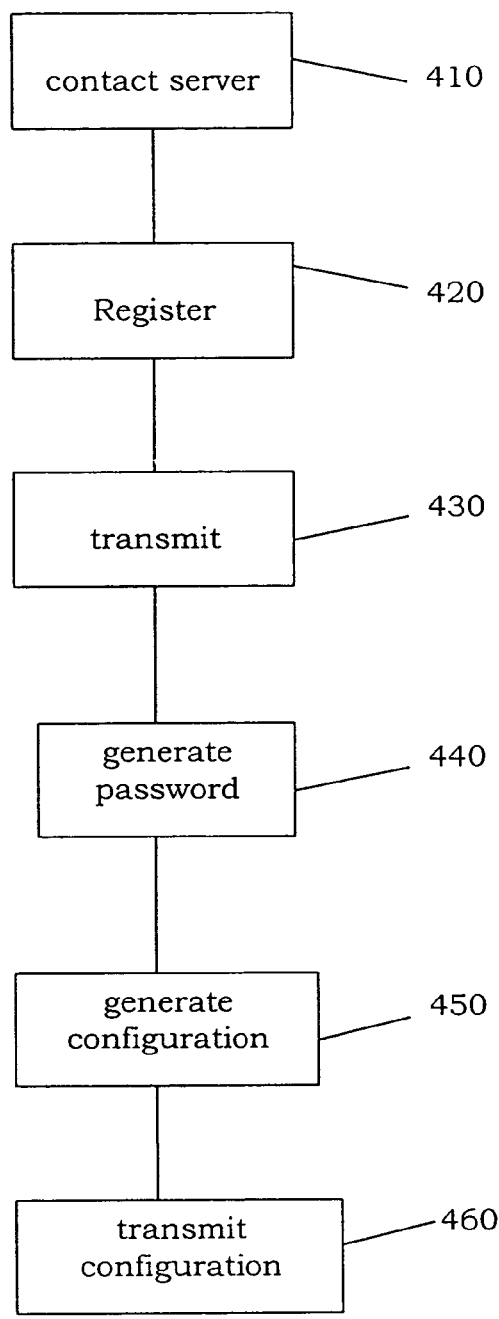
FIG. 4 is a flowchart for registering a client terminal at a server.

When a client terminal has not registered yet with the server because it was recently purchased or acquired, a registration procedure may be carried out as illustrated in FIG. 4. The server may be contacted 410 either by the navigation device 20 or by the computer terminal 30. If the client terminal/navigation device 20 contacts the server, the telecommunications network 40 is used. On the other hand, when the computer terminal 30 contacts the server, a TCP/IP based communication network 50 may be used. The user may register 420 the client terminal by identifying the type of client terminal and the identification number of the terminal and transmit the identification to the server 430. The reception of the identification data may be acknowledged and a password for the client terminal may be generated 440. During this session, configuration data may be generated 450. An example of a standard configuration may be that configuration used when accessing the server for the first time.

Starting from this standard configuration, the user of the terminal may change the configuration of the terminal in a step-by-step procedure. The new configuration may be transmitted to the navigation device 460 when the process is completed. The communication protocol for this process may be a short message services (SMS) protocol, where the SMS message contains the configuration data for the client terminal. The registration process for configuring the client terminal may be initiated by the client terminal using WAP technology or by using the computer terminal and the Internet.

Figure 5:
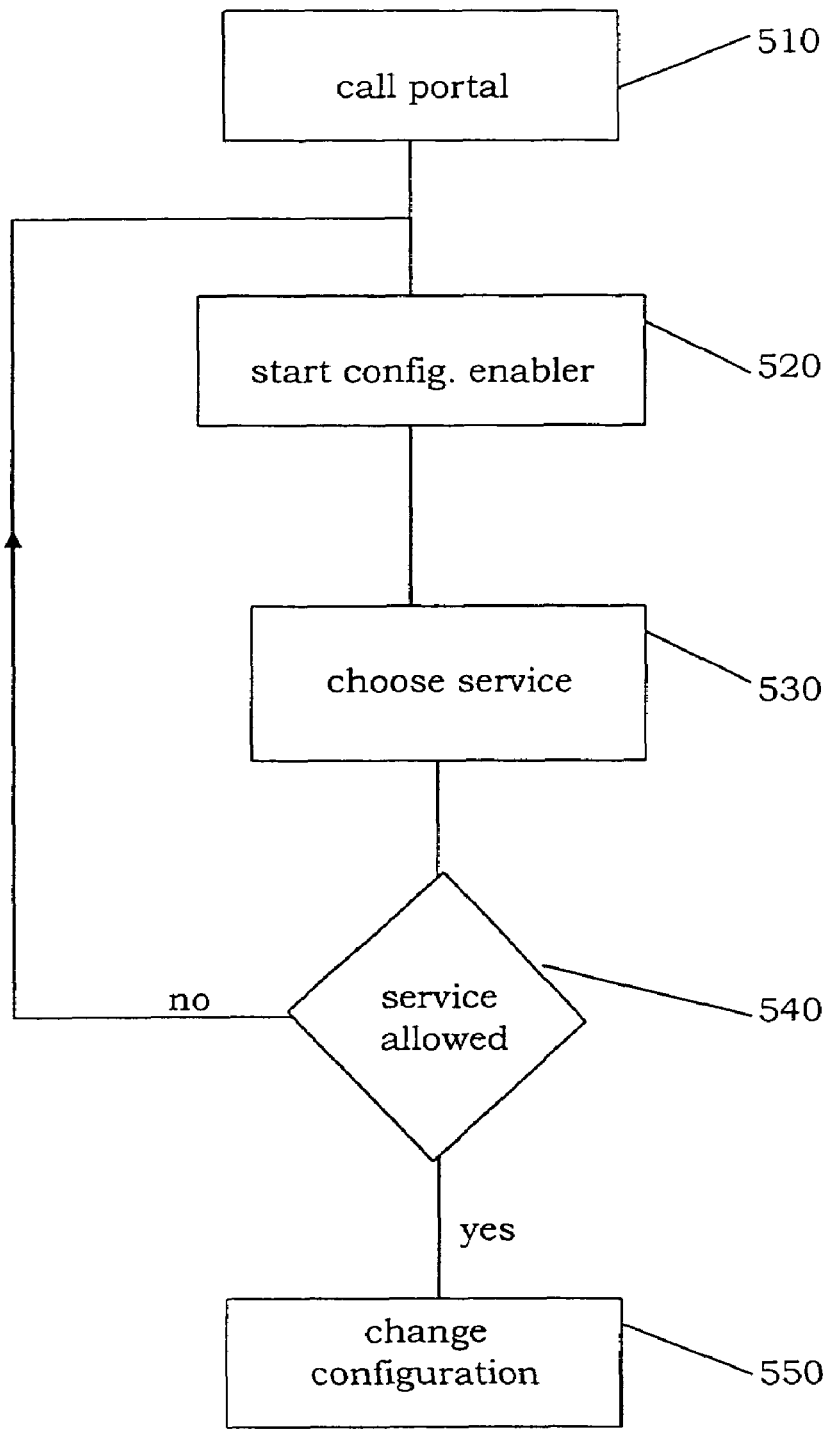
FIG. 5 is a flowchart for changing the configuration of a client terminal.

In FIG. 5, a method for changing the configuration of a client terminal is shown in more detail. When the portal on the server has been called 510, i.e., the client terminal is identified together with its password, the configuration enabling device may now be started 520. The configuration of the client terminal may be changed by choosing different services provided on the server 530. The services may be selected by checking the boxes that are linked with the available services. A verification of the selected services may be carried out 540. By way of example, the server may comprise service type identifiers associated with the received service request. The server may further comprise a list of predetermined access rights and/or terminal capabilities of the requesting terminals, and may determine whether the received service request is valid based upon the capabilities of the client terminal. Because the configuration enabling is done on the server, the operator of the server can determine in advance which client terminal can access the respective services.

For example, it may be determined that the navigation devices produced for a certain car manufacturer may have access to all the services provided on the particular server established by the car manufacturer. Client terminals produced for another car manufacturer may only have limited service access to the first car manufacturer's server. The server may have the identification number for each client terminal that is associated with service type identifiers for each identification number. Further, the client terminals from other car manufacturers may have various communication and messaging capabilities for accessing the first car manufacturer's server. These communication capabilities may be matched to the identification number of the client terminals as well.

As shown in FIG. 5, a requesting client terminal may compare the service type identifier associated with the received service response. The received response may be compared to the stored access rights and/or terminal capabilities that are available to the client terminal. The client terminal may verify whether the service response is really accessible 540 ensuring that the terminal does not react or act upon data that may cause the terminal to malfunction. In another example, the server may control the access to the information requested by a certain client terminal and approval will depend on the identification number of the client terminal. The server may recognize that the response to the client terminal may not be allowed because the system and client terminal configurations are incompatible.

In another example, the server may check only whether the service the user has requested is free of charge or whether the subscription for which the user purchased is current. The control of the individual client terminals may be maximized when the identification number of the terminal is associated with the allowed services stored on the server. The operator or system can determine in advance what services are available to the user of the client terminal and maximize control of the service.

In FIG. 5, if the user of the client terminal is allowed to change the configuration and update the client terminal with added or deleted services, the configuration may be updated 550. As set forth above, the client terminal may communicate with the server by using the SMS technology such that the client terminal will transmit and receive SMS messages. The configuration update may be carried out in a number of different ways.

For example, the user of the client terminal may get a message, e.g., an SMS, indicating that the user should contact the server so that the configuration update can be carried out. In another example, the user of the client terminal, or the terminal itself, may receive a message, e.g., an SMS that includes the configuration data. This message may update the client terminal with the new configuration data. In yet another example, the client terminal may receive an SMS initiated call from the server, and the update will take place as soon as the terminal responds to the server. The call from the server may be, for example, a WAP call to the client terminal. Further, the user of the client terminal might call the server without having received a message beforehand, and the update will be carried out after the log-on procedure.

Figure 6:
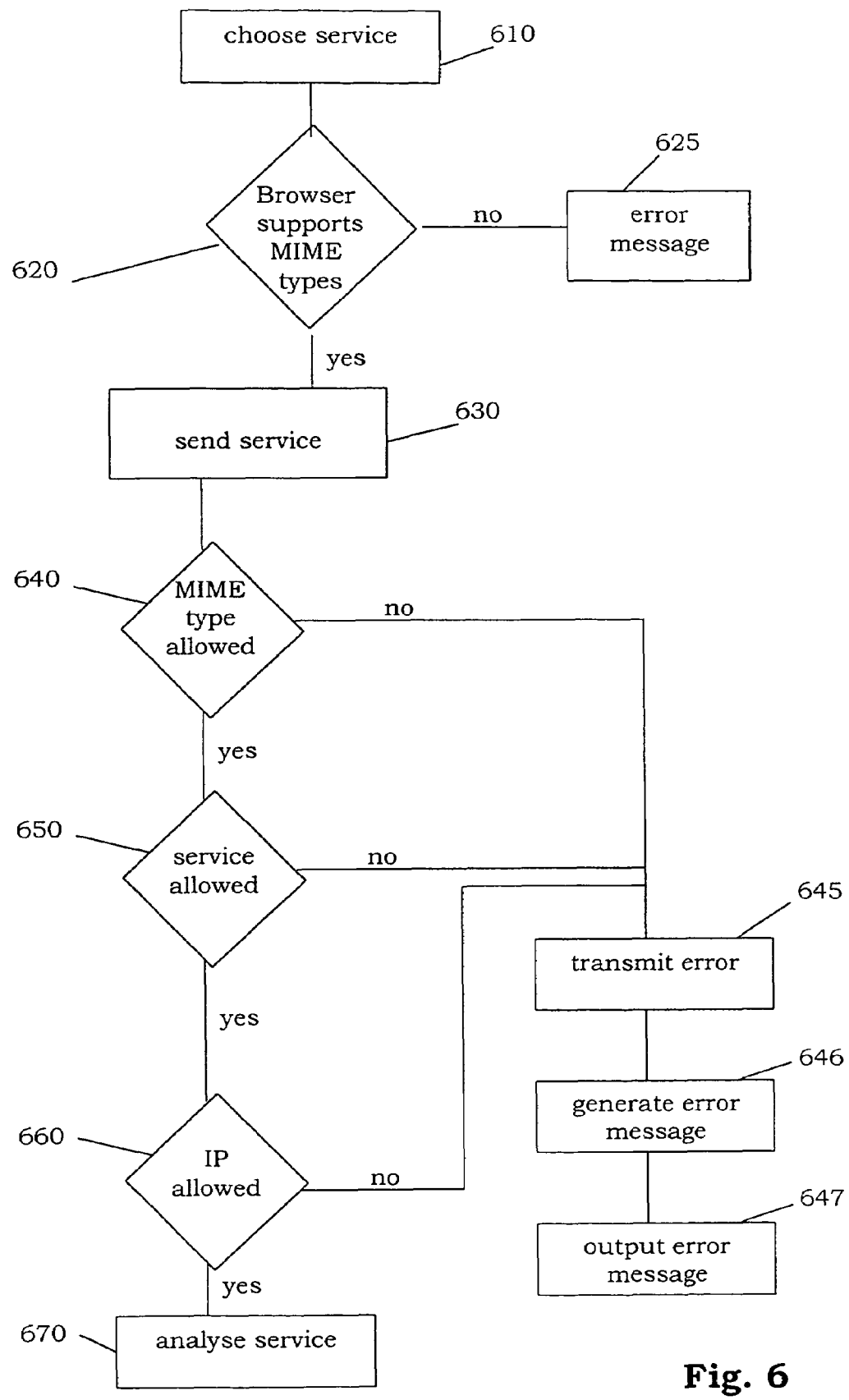
FIG. 6 is a flowchart for authenticating a service request from a client terminal from the server.

The server and the client terminal may both check the respectively transmitted data after the client terminal requests a certain service from the server, as illustrated in FIG. 6. When the client terminal contacts the server, the terminal may pass the Multi-purpose Internet Mail Extensions ("MIME") Types that it is capable of decoding. MIME Types inform the user of the transmitted data of the format of the extensions of the data. The MIME Types assist in transport of different types of data in a communications network and making the data understandable for the different client terminals. The transmission of the MIME Types to the server during the log-on procedure may help to define the format of the transmitted configuration data, so that the server may return messages to the client terminal in an understandable format. After selecting the requested service 610, the server may determine whether the transmitted data has MIME Types that can be decoded by the client terminal 620. If not, a message may be produced 625 and transmitted to the client terminal. However, if the determination 620 is positive, the server may transmit the requested service 630 to the client terminal.

The client terminal may verify the received data before using the information. For example, the terminal may detect whether the received data was sent in the format of its MIME Type. If not, an error message may be transmitted back to the server 645. An error message may be generated further on the server 646 and transmitted back to the client terminal 647 indicating that the appropriate MIME Type is not available. If the transmitted MIME Type is allowed, the terminal may determine whether the service type identifier associated with the received service response identifies the service as an allowed service 650 for the client terminal. This verification by the client terminal is necessary to avoid the processing of data by the terminal that is not formatted correctly. Such processing could cause the terminal to enter an undefined state or result in the misinterpretation of data by the terminal. If the service is not allowed, an error message may be generated and output to the client terminal.

The client terminal also may verify whether the IP address of the server is allowed 660 based on the information that may be stored in the client terminal's memory. In this way, the terminal may associate server identifiers with service type identifiers and compare a received server identifier against the stored server identifiers to determine whether the service response is authorized. Thus, the processing of services originating at other servers and receiving configuration data from other servers may be avoided.

For example, a requested service may involve an order from a server to transmit position data calculated by the navigation device to a server. Alternatively, the order may comprise informing a server of the current vehicle status when the navigation device is installed in the car and can provide that information. To prevent the transmission of this data to an unauthorized server, the client terminal may determine whether the order for the requested service originated from the appropriate server. If it did, then the ordered service data may be transmitted to the server and analyzed 670. If not, a message, as described above, may be generated, output, and transmitted by the client terminal.

Other types of information may be requested from the client terminal. Such information may include positional information that might be requested when the server senses that an automobile with a navigation device has been involved in an accident. The server might request the positional information so that emergency services might be dispatched. The server also might request ignition information, mileage status, vehicle malfunction data from the on-board computer or even transmit a signal to unlock the doors in the right situation. The navigational device may verify and authenticate such commands.

Figure 7:
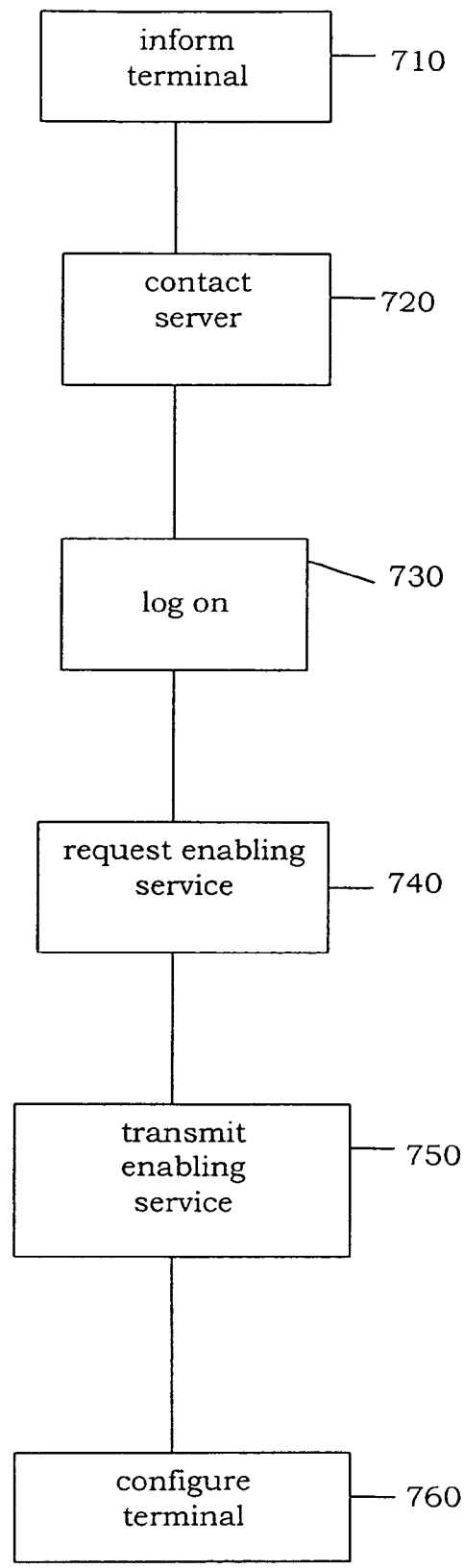
FIG. 7 is a flowchart of a client terminal receiving new access rights.

Another example for controlling the access of client terminals to a server is shown in FIG. 7. The client terminal, in this example, a navigation device, may be produced by a manufacturer of after-market navigation devices and sold to users who install the navigation device in their vehicle. Such vehicles may include trucks, buses, boats, motorcycles, bicycles, automobiles and other modes of transportation. A navigation device also may be sold to different vehicle manufacturers who sell the vehicle with the navigation device already installed. In this example, the client who buys the vehicle may not know who manufactured the navigation device. Thus, it is assumed that, either the manufacturer of the navigation device, or the vehicle manufacturer will have a portal that provides information and services to their clients. If the portal is operated by a car manufacturer, this manufacturer may not want clients of other car manufacturers to have the ability to access the portal and use their services. To prevent this scenario from occurring, the operator of the portal may store the access rights of the different terminals associated with the identification numbers of the different terminals and the respective passwords. Thus, when a client terminal originating from another car manufacturer attempts to log-on to the server, the server denies access to the client terminal.

Alternatively, the car manufacturer may want to differentiate the services provided to each client. For example, a manufacture may allow a client who bought a very expensive, high-end vehicle to access all the services free of charge while denying the same services to the purchaser of a less expensive vehicle unless the purchaser of the less-expensive car pays for the services. In this case, the server may comprise a list with the identification numbers of the terminals and a set of services that are allowed for each identification number or terminal. When the client terminal accesses the server, the server checks whether the requested service is valid for this client terminal. If not, the client will be denied access or charged extra for the requested services.

There may be situations where the operator of the portal wants to change the access rights for multiple client terminals. In this example, the manufacturer of the navigation device may have an agreement with a car manufacturer that the customers of the car manufacturer will be able to use the portal of the navigation device manufacturer. The client terminals may receive access information when the client terminals contact the server. In another instance, a first car manufacturer may allow a second car manufacturer to use its portal for the navigation device. The client terminals that did not have access rights to the server or to the portal may be re-configured to permit access and will receive the configuration updates from the appropriate servers allowing access to the second servers.

As shown in FIG. 7, the client or terminal that previously had no access may be notified that it will be enabled to use the available services provided on the portal 710. This notification may be done by a letter indicating to the user, the identification number of the client terminal associated with a password. Alternatively, the notification also may be transmitted to the client terminal via an SMS. After having received this information, the client terminal may contact the server 720 and log-on 730 to the server with the indicated information in the notification.

An enabling service also may be provided on the server for the group of client terminals that will be authorized to use the services provided on the portal. The user of the client terminal may request the enabling service to update the configuration data so that the client terminal may access the predetermined services 740. The enabling service may be transmitted or downloaded to the client terminal, in this example a navigation device 750 so that the user can select the services. Once the desired services are selected the client terminal will receive the new configuration data 760 and use the services provided on the server. The user of the client terminal may at any time change the configuration of the client terminal, but this change of configuration is in accordance with the rights determined by the server for each client terminal. Thus, the operator of the server may decide whether a configuration of a client terminal will be changed or what access rights each terminal may have.

This application is not limited to the particular examples described above. The individual components of the described system may be combined in any suitable manner to practice the system according to the respective demands of the user. In addition, while various aspects of the invention have been described, it will be apparent to those of ordinary skill in the art that many more aspects and implementations are possible within the scope of the invention. Accordingly, the invention is not to be restricted except in light of the attached claims and their equivalents.

What is claimed is:

1. A method for providing location-based navigation subscription services from a service provider to a vehicle navigation device, comprising:
   providing a wireless connection between the navigation device and a server of the service provider by way of a communications network, where the server is adapted to provide the location-based navigation subscription services to the navigation device;
   modifying service configuration data relating to access rights for the location-based navigation subscription services at the navigation device;
   providing the modified service configuration data from the navigation device to the server by way of the communications network, where the modified service configuration data has been modified at the navigation device to alter access to the location-based navigation subscription services provided by the server to the navigation device;
   storing the modified service configuration data on the server to allow access to the location-based navigation services of the server based on the modified service configuration data changes made at the navigation device;
   altering access to the location-based services by the navigation device at the server based on the modified service configuration data;
   storing the modified service configuration data in the navigation device;
   using the navigation device to request a location-based service from the server by way of the communications network;
   transmitting a response to the service request from the server to the navigation device, where the response includes a service type identifier specific to the type of service requested by the navigation device;
   receiving a response to the service request from the server at the navigation device;
   comparing the modified service configuration data stored at the navigation device with the service type identifier to verify that the received response corresponds to a location-based service that is accessible to the navigation device; and
   inhibiting use of the received response at the navigation device if the received response does not correspond to a location-based service that is accessible to the navigation device.

2. The method of claim 1, further comprising providing additional service configuration data relating to the services provided on a second server.

3. The method of claim 1, where the service configuration data for the navigation device is modified through a user interface of the navigation device using a configuration data editing process performed by the navigation device.

4. The method of claim 1, where the navigation device and the server communicate with each other using a Wireless Application Protocol (WAP).

5. The method of claim 1, where the server compares a service type identifier associated with a service request from the navigation device with stored access rights for the navigation device to determine whether to allow a service request.

6. The method of claim 1, where the modified service configuration data is transmitted to the navigation device by a data messaging service.

7. The method of claim 6, where the data messaging service comprises short message service technology (SMS).

8. The method of claim 1, where the modified service configuration data is transmitted to the navigation device when the navigation device requests a configuration data update.

9. The method of claim 8, further comprising notifying the navigation device of a configuration data modification from the server.

10. The method of claim 1, further comprising:
   transmitting a navigation device identification number to the server;
   generating a login-password request by the server and transmitting it to the navigation device;
   providing a login-password associated with the identification number to the server;
   verifying the login-password; and
   logging the navigation device onto the server.

11. The method of claim 10, where the modified service configuration data is transmitted to the navigation device upon logging on to the server with the navigation device.

12. The method of claim 10, where the modified service configuration data of the navigation device is stored on the server together with the identification number of the navigation device.

13. The method of claim 12, where the navigation device is enabled for user modification of its service configuration data, upon logging on to the server.

14. A method comprising:
- providing access to one or more services of a location-based navigation subscription to a vehicle navigation device based on service configuration data stored on a server adapted to provide the services;
- using the vehicle navigation device to wirelessly request a change in the configuration of services available in the location-based navigation subscription;
- modifying the service configuration data stored on the server in response to the wireless request received from the vehicle navigation device;
- storing the modified service configuration data on the server and vehicle navigation device for use in responding to location-based service requests from the vehicle navigation device;
- using the vehicle navigation device to wirelessly request a location-based service from the server;
- wirelessly transmitting a response to the service request from the server to the vehicle navigation device, where the response includes a service type identifier specific to the type of service requested by the vehicle navigation device;
- wirelessly receiving a response to the service request from the server at the navigation device;
- comparing the modified service configuration data at the vehicle navigation device with the service type identifier to verify that the received response corresponds to a location-based service that is accessible to the vehicle navigation device; and
- inhibiting use of the received response at the vehicle navigation device if the received response does not correspond to a location-based service that is accessible to the vehicle navigation device.

15. The method of claim 14, where the location-based subscription services comprise one or more services selected from the group consisting of traffic information services, emergency call services, route calculating services, diagnostic services or a vehicle, and services for finding points of interest.

16. The method of claim 14, further comprising checking at the server whether there is a billing method associated with the navigation device before modifying the configuration data stored on the server for download to the vehicle navigation device.

\* \* \* \* \*

UNITED STATES PATENT AND TRADEMARK OFFICE
CERTIFICATE OF CORRECTION

PATENT NO. : 7,676,830 B2  Page 1 of 1
APPLICATION NO. : 10/933783
DATED : March 9, 2010
INVENTOR(S) : Volker Kuz et al.

It is certified that error appears in the above-identified patent and that said Letters Patent is hereby corrected as shown below:

On the Title Page

Item (30), line 1, under "Foreign Application Priority Data", replace "03019625" with --03019625.7--.

Signed and Sealed this

Eighteenth Day of May, 2010

David J. Kappos
*Director of the United States Patent and Trademark Office*